AMOS W. THOMAS.

Improvement in Tournures.

No. 4,903. Reissued May 14, 1872.

Witnesses:

Benj. Morison

Wm. H. Morison

Inventor:

A. W. Thomas

AM. PHOTO-LITHOGRAPHIC CO. N.Y. (OSBORNE'S PROCESS.)

UNITED STATES PATENT OFFICE.

AMOS W. THOMAS, OF PHILADELPHIA, PENNSYLVANIA.

IMPROVEMENT IN TOURNURES.

Specification forming part of Letters Patent No. 114,624, dated May 9, 1871; reissue No, 4,903, dated May 14, 1872.

Specification describing a new and useful Improvement in Tournures or Bustles, invented by AMOS W. THOMAS, of Philadelphia, in the county of Philadelphia and State of Pennsylvania.

Figure 1:
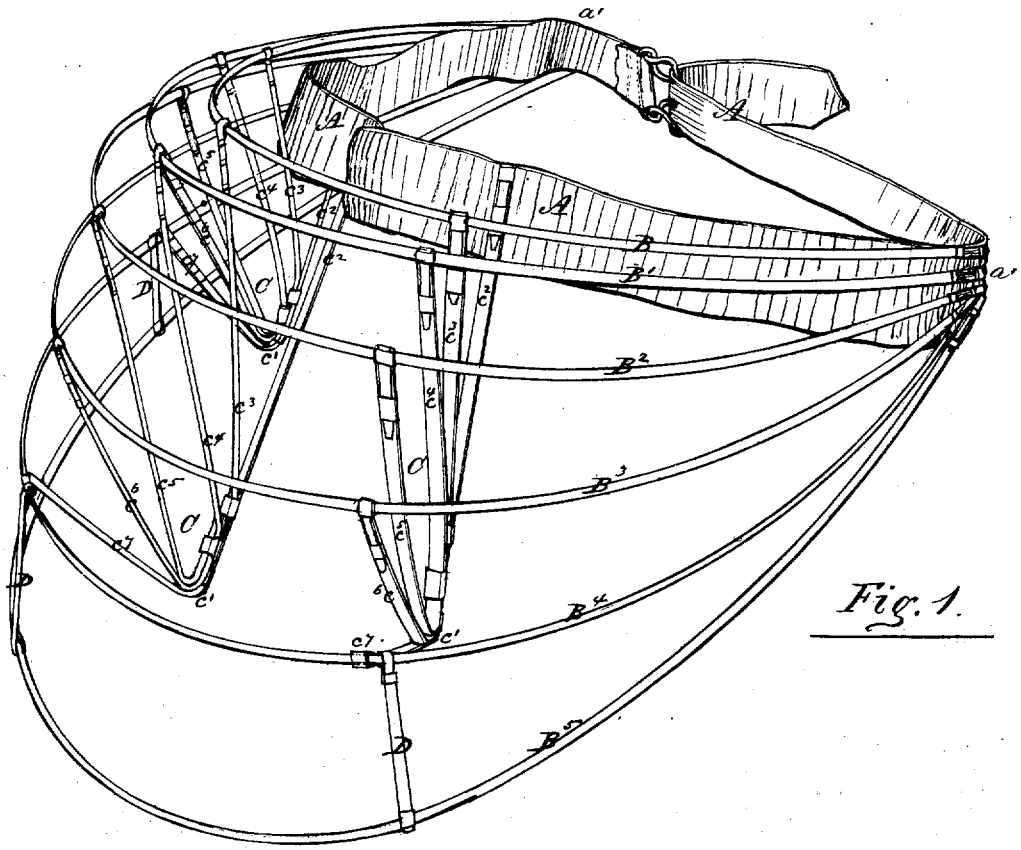
Figure 2:
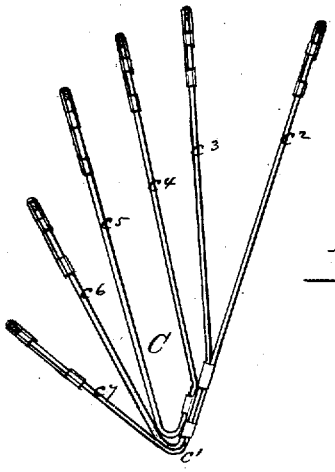

Figure 1 is a perspective view of my improved tournure or bustle. Fig. 2 is a detail side view of one set of braces or standards employed in the same.

Similar letters of reference indicate corresponding parts.

The object of this invention is to afford such a support to the upper rear portion of a lady's dress-skirt as will effectually prevent the weight from swagging the skirt downward, and at the same time be elastic and yielding to lateral pressure or impact. The invention consists in a new arrangement of braces which sustain the bows of the bustle or skirt-support, said braces diverging from their lower ends, where they are collected to stay one another, as hereinafter more fully described.

A in the drawing represents the waistband. B $B^1$ $B^2$ $B^3$, &c., are the bows of the bustle. The waistband is made of suitable fabric. The bows are secured to the waistband at their ends. The upper bow B is the shortest; the others successively increase in length to produce the increase in the projecting curves and the general contour of the whole. In order to maintain the bows the requisite distances apart and enable them to sustain the weight of the dress, they must all be supported or held in their respective positions. For this purpose I have provided a series of standards or braces, C C. Each of these standards or braces consists of as many lengths of flat skirt-wire as there are bows, and one more to connect with the waistband. Thus, in the drawing, where five bows are represented as thus braced, each standard or brace has six lengths or sections, $c^2$, $c^3$, $c^4$, $c^5$, $c^6$, and $c^7$. They all converge at their lower ends, where they are firmly connected, while their upper ends connect with the waistband and the several bows respectively, as shown. The lengths are gradually reduced with the greater distance from the waistband.

In this manner an inward brace is provided which supports each bow from below, giving it strength to hold the skirt, while the natural spring of the bows makes them yielding to pressure from the outside, and causes them to resume their rounded form whenever such pressure ceases.

As a modification, a lower bow, $B^5$, may be simply suspended from the bow $B^4$, next above, by straight wires D D, as shown.

Having thus described my invention, I claim as new, and desire to secure by Letters Patent—

The brace or standard C, composed of a sesies of converging wires which have their outer ends respectively connected to the waistband and the several bows, as set forth.

AMOS W. THOMAS.

Witnesses:
T. B. MOSHER,
W. A. GRAHAM.